T. V. BAKER.
SAW FILING GAUGE.
APPLICATION FILED JAN. 19, 1921.
1,431,087.
Patented Oct. 3, 1922.
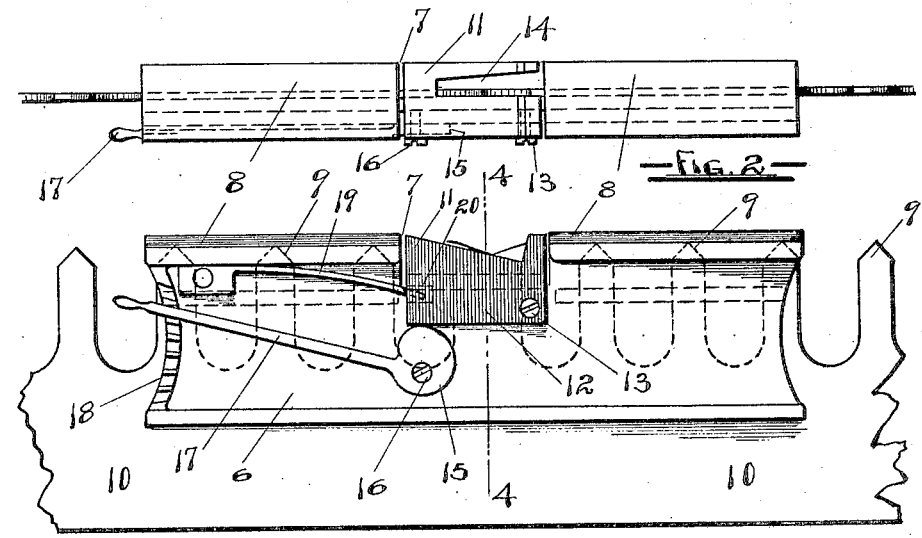
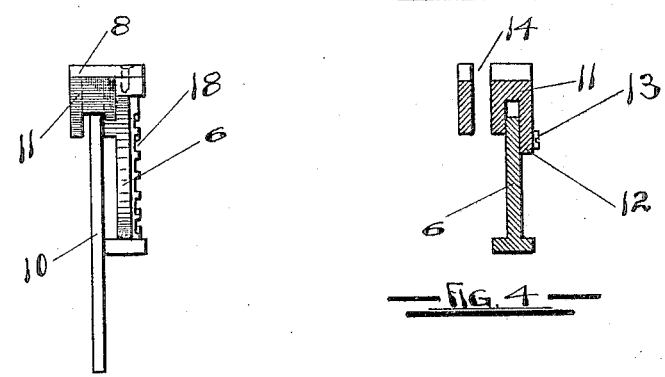
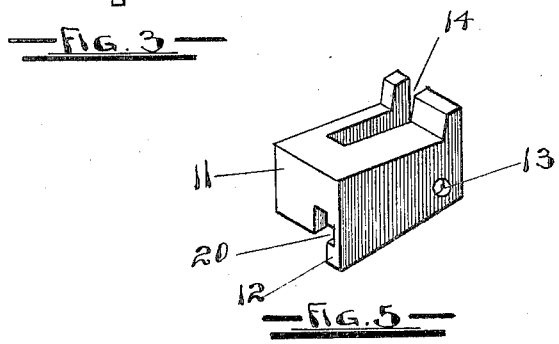
INVENTOR
THOMAS V. BAKER
BY
C. J. Blake
ATTORNEY Patented Oct. 3, 1922.

1,431,087

UNITED STATES PATENT OFFICE.

THOMAS V. BAKER, OF NAPAVINE, WASHINGTON.

SAW-FILING GAUGE.

Application filed January 19, 1921. Serial No. 438,396.

*To all whom it may concern:*

Be it known that I, THOMAS V. BAKER, a citizen of the United States, residing at Napavine, Lewis County, State of Washington, have invented certain new and useful Improvements in Saw-Filing Gauges, of which the following is a specification.

My invention relates to saw filing gauges in general, and particularly to such gauges as are used for filing the raker teeth of cross cut saws, the object of my invention being to provide a device that may be applied to the saw for guiding the file and having an adjustable anvil thereon for varying the angle of the raker teeth.

I accomplish the above object by means of the construction illustrated in the accompanying drawing, which is a part of this application for Letters Patent, like characters of reference indicating like parts throughout the several views thereof, and in which:

Fig. 1 is a side elevation of my device applied to a saw.

Fig. 2 is a plan view thereof.

Fig. 3 is an end elevation of my device.

Fig. 4 is a sectional elevation upon the line 4—4 of Fig. 1.

Fig. 5 is a perspective view of the anvil.

In general my device consists of a body member with suitable guides to contact with the ends of the cutting teeth of the saw, an adjustable anvil pivoted to said body member and having a slot therethrough for the reception of the raker tooth, and means to adjust the angularity of said anvil relatively to the body.

The body member 6 is preferably I shaped in sectional area having a web and flanges with an orifice 7 in the upper flange thereof and extending into the web thereof, in which orifice the anvil is disposed.

Suitable guides 8 are secured upon the two portions of the upper flange separated by the orifice 7 and extending transversely beyond the upper flange so that they form a gauge to contact with the ends of the cutting teeth 9 of the saw 10, as shown in Figs. 1 and 3.

The anvil 11 is substantially of the same width as the guides 8 and alined therewith therebetween. It is provided with an apron 12 which contacts with one face of the web of the body member 6 and is pivoted thereto at 13. The upper face of said anvil is angularly disposed to coincide with the angularity of the raker teeth, as shown in Fig. 1, and a slot 14 is provided through which the raker tooth to be filed is passed.

To adjust the anvil to the required angularity of the raker tooth I provide an eccentric cam 15 pivoted to the body member 6 at 16 and bearing against the apron 12, as shown in Fig. 1. Said cam is provided with an arm 17 which coacts with suitable notches 18 in the body member 6 to retain the cam, and thereby the anvil, in any desired adjustment. A spring 19 mounted upon the body member 6 serves to keep the anvil apron 12 always in contact with the cam 15, the end of said spring being inserted within a suitable slot 20 in the apron 12.

My device may be made of any size, and constructed of any materials deemed convenient and suitable for a device of this character, and while I have illustrated and described a form of construction and arrangement of parts found desirable in materializing my invention, I wish to include in this application all mechanical equivalents and substitutes that may fairly be considered to come within the scope and purview of my invention as defined in the appended claims.

Having disclosed my invention so that others may be enabled to construct and to use the same, what I claim as new, and desire to secure by Letters Patent is:

1. In a saw gauge: a body having a web and mountable upon a saw; an anvil having a slot therein to receive said web; an apron downwardly extending from said anvil and forming one side of said slot extended; a pivotal connection between said apron and said body web; a spring mounted upon said body and seated within said apron; and an eccentric mounted upon said body and coacting with said apron to hold the face of said anvil at any desired angle of inclination relative to said body.

2. In a saw gauge; a body member having radially disposed slots therein; guides upon said body member; an anvil pivotally mounted upon said body member and having an angularly disposed transverse face thereon and a slot therethrough; a cam pivoted upon said body member and coacting with said anvil to angularly adjust the latter; and an arm upon said cam coacting with said slots in said body member to secure said cam in any desired position.

In witness whereof I claim the foregoing as my own I hereunto affix my signature in the presence of two witnesses at Napavine, county of Lewis, State of Washington, this 3rd day of January, 1921.

THOMAS V. BAKER.

Witnesses:
 NED EVANS,
 P. A. QUIST.